(12) United States Patent
McHugh et al.

(10) Patent No.: US 9,340,373 B2
(45) Date of Patent: May 17, 2016

(54) STACKABLE INSULATED GLASS SLAT RACK

(71) Applicant: Integrated Automation Systems, LLC, Bedford Heights, OH (US)

(72) Inventors: Michael Patrick McHugh, Solon, OH (US); Michael Eric Peters, Aurora, OH (US)

(73) Assignee: Integrated Automation Systems, LLC, Bedford Heights, OH (US)

( * ) Notice: Subject to any disclaimer, the term of this patent is extended or adjusted under 35 U.S.C. 154(b) by 0 days.

(21) Appl. No.: 14/569,325

(22) Filed: Dec. 12, 2014

(65) Prior Publication Data

US 2015/0166268 A1    Jun. 18, 2015

Related U.S. Application Data

(60) Provisional application No. 61/915,339, filed on Dec. 12, 2013.

(51) Int. Cl.
| | |
|---|---|
| *B65G 49/06* | (2006.01) |
| *B65D 85/46* | (2006.01) |
| *A47F 7/00* | (2006.01) |
| *B65D 85/48* | (2006.01) |
| *B60P 3/00* | (2006.01) |

(52) U.S. Cl.
CPC ............ *B65G 49/062* (2013.01); *A47F 7/0042* (2013.01); *B65D 85/46* (2013.01); *B65D 85/48* (2013.01); *B60P 3/002* (2013.01)

(58) Field of Classification Search
CPC ...... B65G 49/062; B60P 3/002; B65D 85/48; B65D 85/46; A47F 7/0042; A47F 7/0021; A47F 7/16; A47F 7/163; A01G 1/004; Y10S 414/124; Y10S 414/123
USPC .......................................... 211/41.14, 41.15
See application file for complete search history.

(56) References Cited

U.S. PATENT DOCUMENTS

| | | | |
|---|---|---|---|
| 1,884,062 A | 10/1932 | McSweeney | |
| 2,116,381 A | 5/1938 | Burke | 206/60 |
| 2,566,179 A | 8/1951 | Evans, Jr. et al. | 217/43 |
| 2,902,168 A * | 9/1959 | Allen, Jr. | 211/41.14 |
| 2,923,428 A | 2/1960 | Averill | 220/19 |
| 3,160,120 A | 12/1964 | Skubic | 108/53 |
| 3,193,093 A | 7/1965 | Hansen | 206/62 |
| 3,424,487 A | 1/1969 | Pector et al. | 294/67 |
| 3,499,398 A * | 3/1970 | Murray | 108/53.5 |
| 3,565,018 A | 2/1971 | Jay | 108/53 |
| 3,709,396 A | 1/1973 | Cole | 220/1.5 |
| 3,735,713 A | 5/1973 | Glassmeyer | 108/53 |

(Continued)

*Primary Examiner* — Brian Glessner
*Assistant Examiner* — Paola Agudelo
(74) *Attorney, Agent, or Firm* — Kusner & Jaffe

(57) ABSTRACT

A glass slat rack is provided. The glass slat rack secures glass panels within slots. The glass slat rack includes a base frame, a vertical slat rack and a pivoting slat rack. The vertical slat rack is attached to the base frame and extends substantially perpendicular from the base frame. The vertical slat rack may include a plurality of slats substantially parallel to one another and running vertically, from the bottom end to the top end of the vertical slat rack. The pivoting slat rack is pivotally mounted to the glass slat rack. In certain embodiments, the pivoting slat rack is pivotally connected to the base frame. The pivoting slat rack also includes a plurality of slats 16 forming slots in between. The slots of the pivoting slat rack align with the slots of the vertical slat rack, and thereby secure the glass panels within.

16 Claims, 6 Drawing Sheets

(56) References Cited

U.S. PATENT DOCUMENTS

| | | | | |
|---|---|---|---|---|
| 3,752,332 A | 8/1973 | Theurer | ................... | 214/10.5 R |
| 3,765,550 A | 10/1973 | Tausheck | ........................ | 214/77 |
| 3,804,033 A | 4/1974 | Izawa et al. | ..................... | 108/55 |
| 3,809,234 A | 5/1974 | Kurick | .......................... | 206/448 |
| 3,850,295 A * | 11/1974 | Black | ........................ | A47F 7/04 |
| | | | | 108/53.5 |
| 3,865,250 A | 2/1975 | Jay | ............................... | 211/177 |
| 3,893,705 A | 7/1975 | Allen | ....................... | 280/179 R |
| 3,946,876 A | 3/1976 | Jay | ............................. | 211/60 R |
| 3,955,676 A | 5/1976 | Hansen et al. | ................ | 206/451 |
| 4,014,435 A | 3/1977 | Rowley et al. | ................ | 206/386 |
| 4,098,409 A | 7/1978 | Massey | ........................ | 211/195 |
| 4,202,452 A | 5/1980 | McCormick | ..................... | 211/41 |
| 4,258,631 A | 3/1981 | Brown | ............................ | 108/91 |
| 4,460,095 A | 7/1984 | Kessler et al. | ................ | 211/69.1 |
| 4,714,027 A | 12/1987 | Stern | ............................ | 108/111 |
| 4,773,547 A | 9/1988 | Bell | ................................ | 211/194 |
| 4,809,146 A | 2/1989 | Johnson | ....................... | 362/367 |
| 4,899,891 A | 2/1990 | Sipilä et al. | ..................... | 211/41 |
| 4,934,538 A | 6/1990 | Beyer | ......................... | 211/49.1 |
| 5,145,073 A | 9/1992 | Kitagawa et al. | ............... | 211/41 |
| 5,217,125 A | 6/1993 | Swanson | ........................ | 211/195 |
| 5,228,821 A | 7/1993 | Gleffe et al. | ..................... | 414/403 |
| 5,246,121 A | 9/1993 | Mitake et al. | ................... | 211/41 |
| 5,351,628 A | 10/1994 | Breezer et al. | ............... | 108/56.1 |
| 5,386,919 A | 2/1995 | Long | ................................ | 217/36 |
| 5,388,532 A | 2/1995 | Wakano | ........................ | 108/56.1 |
| 5,467,516 A | 11/1995 | DeGeorge | ....................... | 29/239 |
| 5,584,399 A | 12/1996 | King | ................................ | 211/41 |
| 5,639,174 A | 6/1997 | Gonska | ......................... | 403/103 |
| 5,641,076 A | 6/1997 | Englund | ....................... | 211/41.14 |
| 5,676,066 A * | 10/1997 | Cavalier | ................. | B65D 19/44 |
| | | | | 108/55.1 |
| 5,685,437 A | 11/1997 | Lisec | ............................ | 211/41 |
| 5,755,472 A | 5/1998 | Clive-Smith | ................. | 294/67.1 |
| 5,829,361 A | 11/1998 | Fenton | ......................... | 108/54.1 |
| 5,850,924 A | 12/1998 | Borter | .......................... | 211/41.14 |
| 5,906,282 A | 5/1999 | Aldrich et al. | ............... | 211/41.14 |
| 5,924,577 A | 7/1999 | Gessert | ......................... | 211/41.1 |
| 5,941,398 A | 8/1999 | Harris | .......................... | 211/60.1 |
| 5,967,056 A | 10/1999 | Plante | .......................... | 108/56.1 |
| 6,095,292 A | 8/2000 | Buck | ............................. | 188/57.14 |
| 6,102,206 A * | 8/2000 | Pride | .................... | B65D 25/102 |
| | | | | 206/454 |
| 6,247,601 B1 | 6/2001 | Norton et al. | ............... | 211/41.14 |
| 6,279,763 B1 | 8/2001 | Bush | ............................. | 211/195 |
| 6,386,376 B1 | 5/2002 | Mendoza-Castillo | | |
| | | et al. | .......................... | 211/41.14 |
| 6,435,108 B2 | 8/2002 | Braley | ......................... | 108/51.11 |
| 6,585,126 B1 | 7/2003 | Grigsby, Sr. et al. | ............. | 220/6 |
| 6,588,605 B1 * | 7/2003 | Volkert | ............... | B65D 88/005 |
| | | | | 206/449 |
| 6,705,466 B2 * | 3/2004 | Bartholomew | ........ | B65D 85/48 |
| | | | | 206/386 |
| 6,742,663 B2 * | 6/2004 | Chubb | ................... | B65D 19/12 |
| | | | | 211/41.14 |
| 7,080,600 B2 | 7/2006 | Jurdens | ........................ | 108/55.1 |
| 7,152,749 B2 | 12/2006 | Beck | ............................ | 211/194 |
| 7,182,559 B1 | 2/2007 | Groth et al. | ..................... | 410/32 |
| 7,264,126 B1 | 9/2007 | Bergeron | ..................... | 211/41.14 |
| 7,387,215 B1 | 6/2008 | Grigsby, Sr. | ..................... | 217/45 |
| 7,469,643 B2 | 12/2008 | Isle et al. | ................... | 108/57.25 |
| 7,516,856 B2 | 4/2009 | Lee et al. | ....................... | 211/189 |
| 7,578,244 B2 | 8/2009 | Williams, Jr. | ................ | 108/56.3 |
| D603,123 S | 10/2009 | Canters et al. | .................. | D34/38 |
| 7,624,887 B2 | 12/2009 | Avery | ........................... | 220/9.2 |
| 7,648,035 B2 | 1/2010 | Edwards et al. | ........... | 211/41.14 |
| 7,802,526 B2 | 9/2010 | Brady et al. | ................. | 108/53.5 |
| 7,934,608 B2 | 5/2011 | Ydstrom | ..................... | 211/41.17 |
| 7,980,397 B2 | 7/2011 | Noda et al. | .................. | 211/41.14 |
| 7,997,845 B2 | 8/2011 | Carlei | ............................ | 414/10 |
| 8,002,128 B2 | 8/2011 | Kern et al. | ...................... | 211/194 |
| 8,210,374 B2 | 7/2012 | Harpole | ........................ | 211/195 |
| 8,327,775 B2 | 12/2012 | Fox Harris | .................. | 108/53.3 |
| 8,522,987 B2 | 9/2013 | Lim | ............................. | 211/134 |
| 8,789,710 B1 | 7/2014 | Moore et al. | ............... | 211/41.14 |
| 2003/0141213 A1 * | 7/2003 | Bartholomew et al. | ........ | 206/454 |
| 2003/0196971 A1 | 10/2003 | Jeskey et al. | ............... | 211/41.14 |
| 2004/0238465 A1 * | 12/2004 | Mercure | ..................... | 211/41.14 |
| 2006/0043032 A1 | 3/2006 | McHugh | .................... | 211/41.14 |
| 2006/0131305 A1 | 6/2006 | Clarke | .............................. | 220/6 |
| 2006/0196838 A1 | 9/2006 | Mercure et al. | ............. | 211/41.1 |
| 2006/0254476 A1 | 11/2006 | MacDonald et al. | ........ | 108/53.3 |
| 2007/0045204 A1 * | 3/2007 | Huard et al. | ............... | 211/41.14 |
| 2007/0187916 A1 * | 8/2007 | Gregory et al. | ............. | 280/79.3 |
| 2008/0152453 A1 | 6/2008 | Mix | ............................ | 410/32 |
| 2012/0000866 A1 | 1/2012 | Huszczo et al. | ........... | 211/41.14 |
| 2012/0125238 A1 | 5/2012 | Johnson et al. | ............ | 108/57.32 |
| 2013/0112640 A1 | 5/2013 | Desmond | ...................... | 211/153 |
| 2014/0054340 A1 | 2/2014 | McDonald et al. | ........... | 224/405 |

* cited by examiner

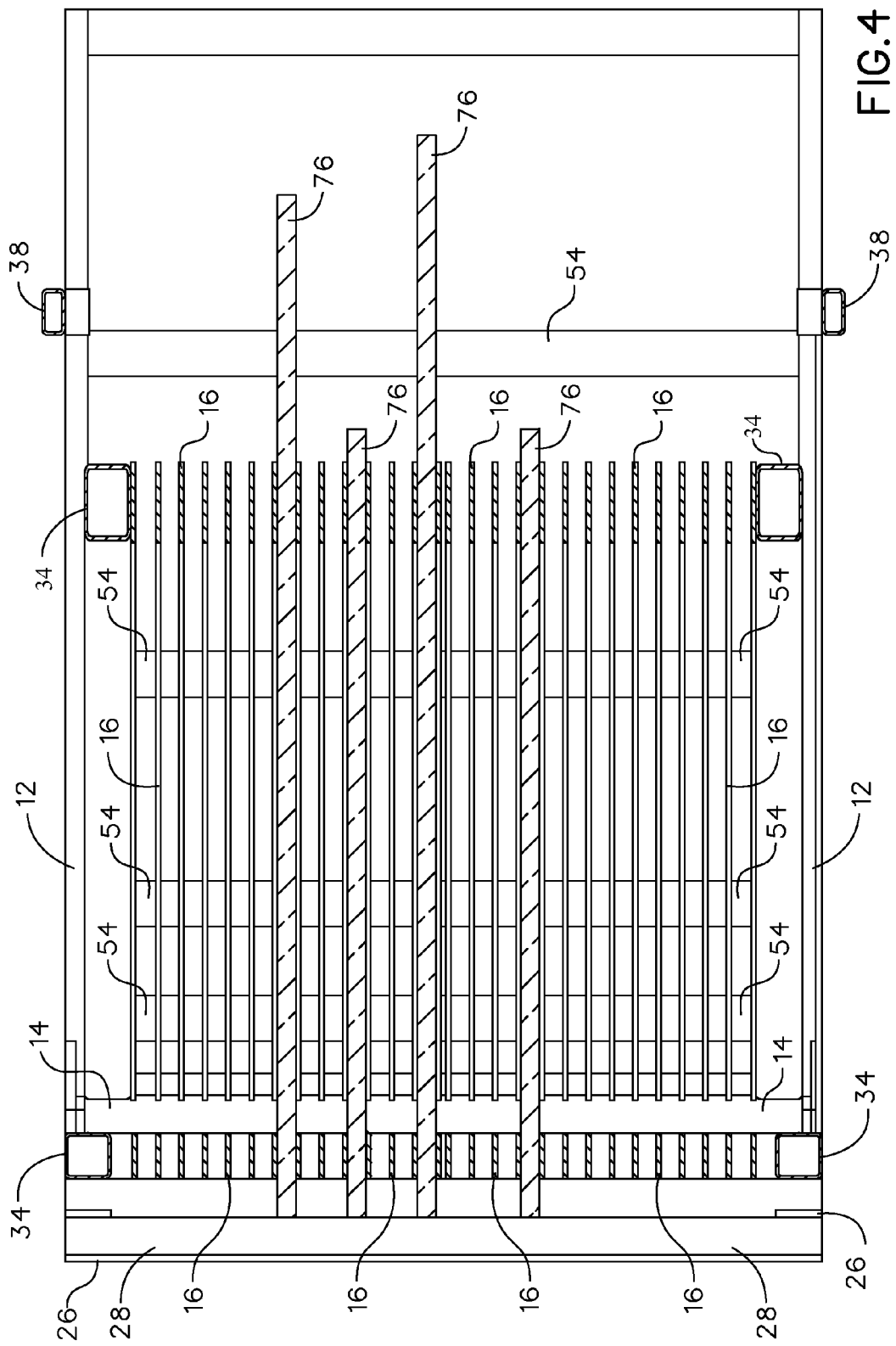

STACKABLE INSULATED GLASS SLAT RACK

CROSS-REFERENCE TO RELATED APPLICATION

This application claims the benefit of priority of U.S. provisional application No. 61/915,339, filed Dec. 12, 2013, the contents of which are herein incorporated by reference.

BACKGROUND OF THE INVENTION

The present invention relates to a stackable insulated glass slat rack and, more particularly, to a stackable insulated glass slat rack that comprises a pivoting frame and a plurality of slats to support a plurality of insulated glass units.

Shipping insulated glass units causes damage (cracks, scratches, chips, etc) and the racks used to ship the glass takes up a large amount of room in a facility. Standard racks use round "Harp" rods to separate the insulated glass units which do not support the unit very well and cause damage when loading and unloading the rack. The typical "harps" are angled to the back of the rack with no support towards the front of the glass units which can also cause damage in transit. Further, standard racks do not stack and take up a large amount of floor space when not in use.

As can be seen, there is a need for an improved rack for shipping insulated glass units.

SUMMARY OF THE INVENTION

In one aspect of the present invention, a glass slat rack comprises: a base frame; a vertical slat rack attached to and extending substantially perpendicular from the base frame, wherein the vertical slat rack comprises a plurality slats substantially parallel to one another and running vertically, forming slots in between; and a pivoting slat rack pivotally mounted to the glass slat rack and comprising a plurality of slats forming slots in between, wherein the slots of the pivoting slat rack align with the slots of the vertical slat rack.

These and other features, aspects and advantages of the present invention will become better understood with reference to the following drawings, description and claims.

BRIEF DESCRIPTION OF THE DRAWINGS

FIG. 4 is a section view of the present invention, taken along line 4-4 in FIG. 2;

DETAILED DESCRIPTION OF THE INVENTION

Figure 1:
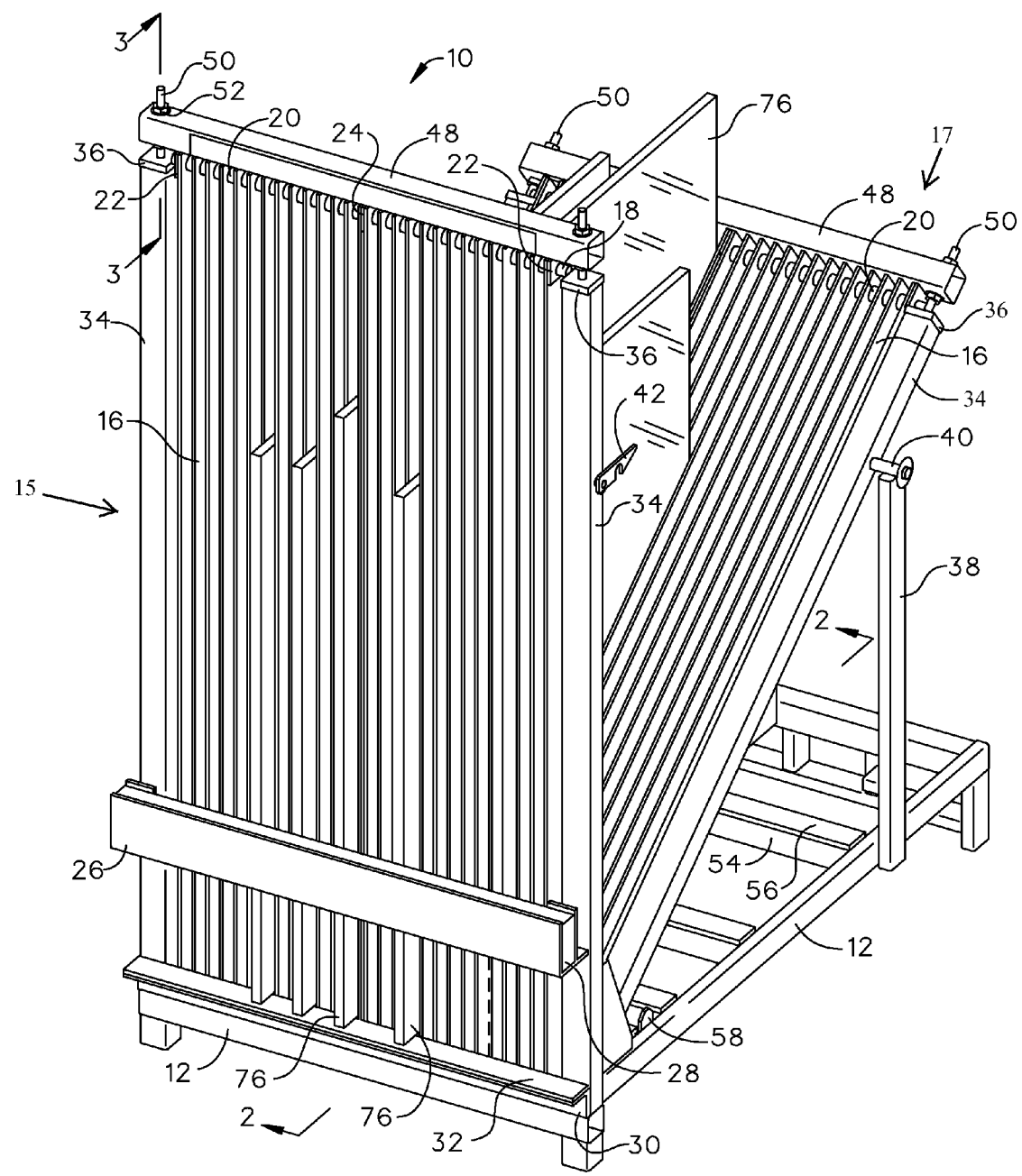
FIG. 1 is a perspective view of the present invention, shown in use.
Figure 2:
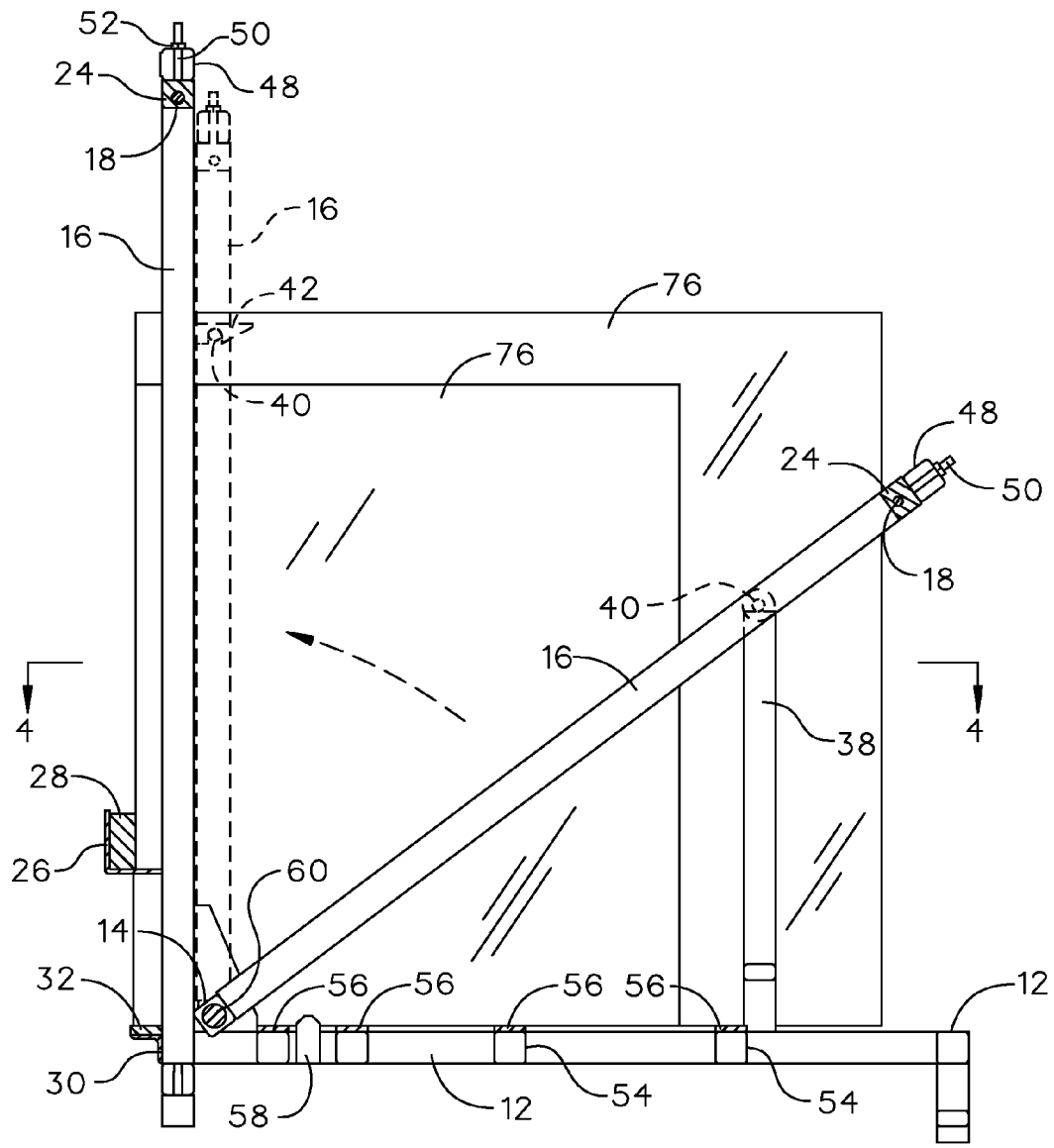
FIG. 2 is a section view of the present invention, taken along line 2-2 in FIG. 1.
Figure 3:
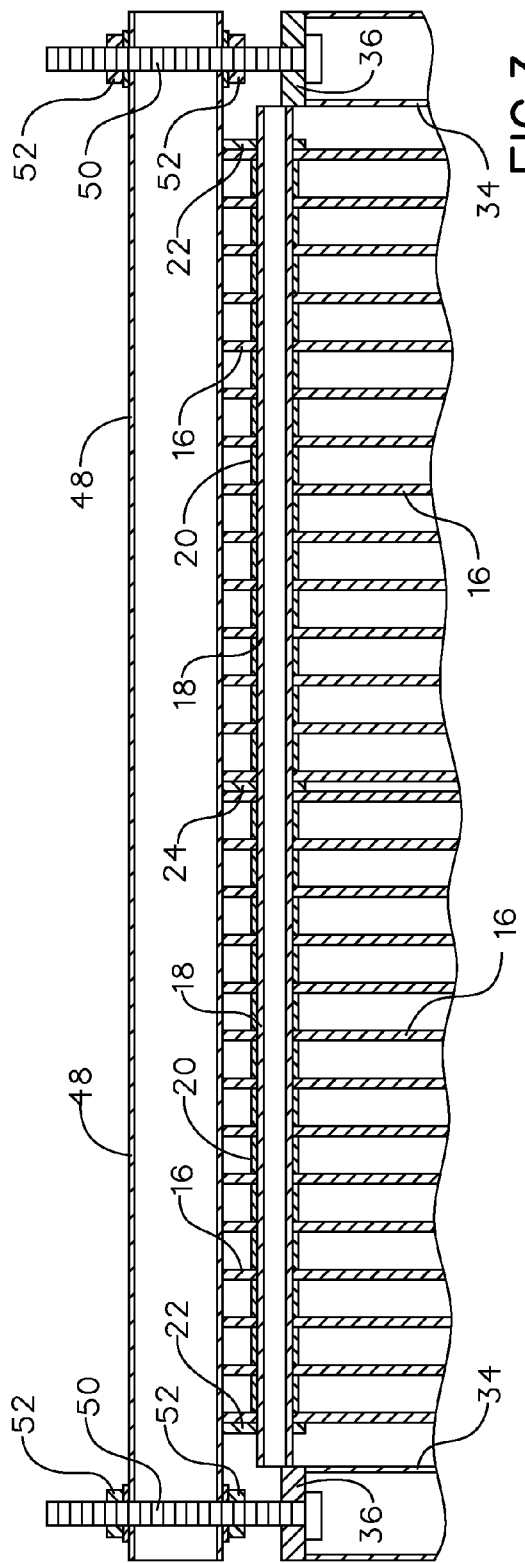
FIG. 3 is a section view of the present invention, taken along line 3-3 in FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a stackable insulated glass slat rack. The stackable insulated shipping slat rack provides greater stability for glass units with wide slats to hold the units in the slots. Further, the present invention includes slats that are tilted forward while resting on the floor to eliminate movement in the rack during shipment. The present invention may also fold up and can be stacked on each other to reduce the footprint of the racks in the facility. By reducing damage to the insulated glass units during shipping, the present invention reduces costs to manufacture replacements. Further, stacking the racks increases storage capacity and frees up floor space for other manufacturing activities. The present invention may remove the round "Harp" rods and uses flat, wide slats to separate the Insulated Glass Units which provide a wider contact area for support. The slats are located vertical and on a pivotable angle supporting the insulated glass unit at the front edge and also along the entire length of the unit.

Referring to FIGS. 1 through 10, the present invention includes a glass slat rack 10. The glass slat rack 10 secures glass panels 76 within slots. The glass slat rack 10 includes a base frame 12, a vertical slat rack 15 and a pivoting slat rack 17. The vertical slat rack 15 is attached to the base frame 12 and extends substantially perpendicular from the base frame 12. The vertical slat rack 12 may include a plurality of slats 16 substantially parallel to one another and running vertically, from the bottom end to the top end of the vertical slat rack 15. The pivoting slat rack 17 is pivotally mounted to the glass slat rack 10. In certain embodiments, the pivoting slat rack 17 is pivotally connected to the base frame 12 by a pivot frame cross bar 14 with a pivot rod 60 within. The pivoting slat rack 17 also includes a plurality of slats 16 forming slots in between. The slots of the pivoting slat rack 17 align with the slots of the vertical slat rack 15, and thereby secure the glass panels 76 within.

Figure 7:
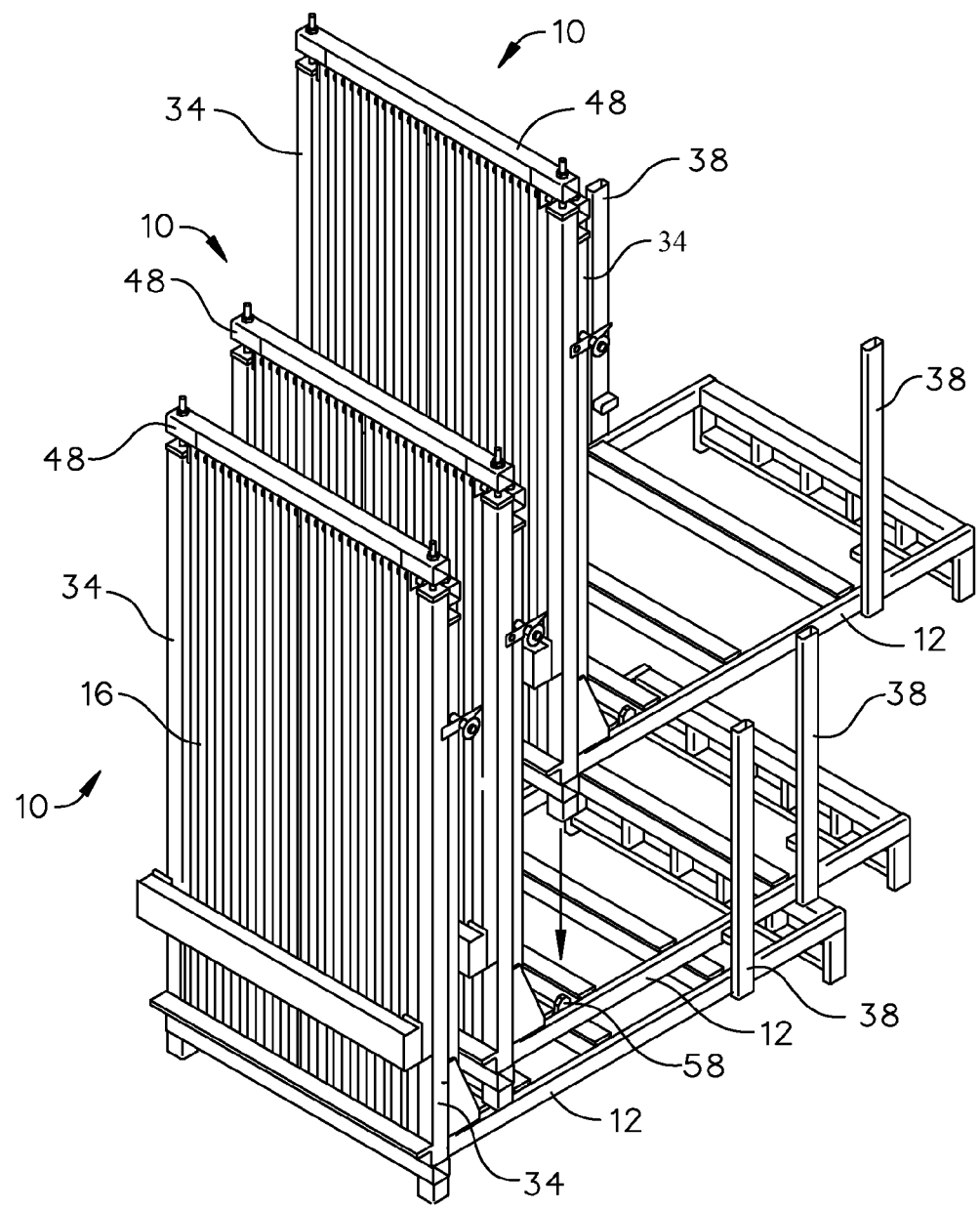
FIG. 7 is a perspective view of the present invention, illustrating the stacking of multiple racks.
Figure 8:
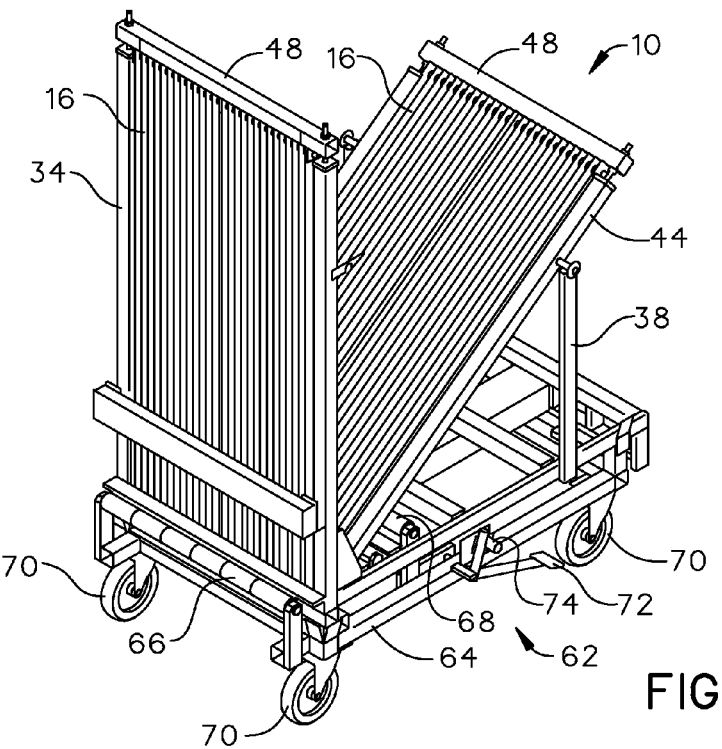
FIG. 8 is a perspective view of the present invention, shown in use with the rolling base.
Figure 9:
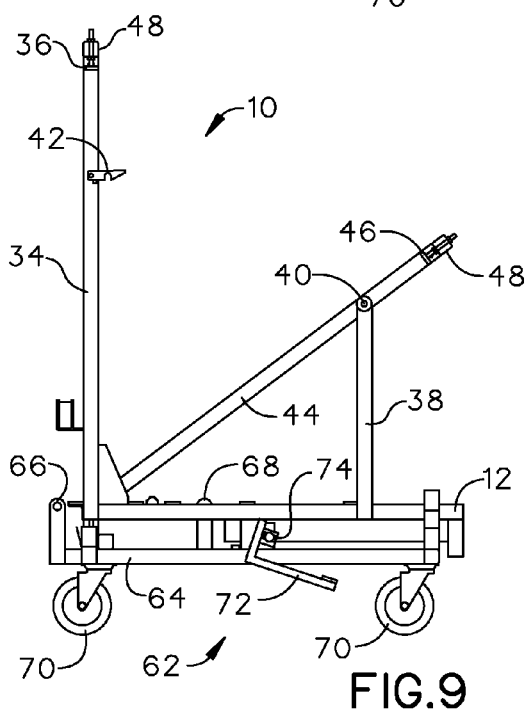
FIG. 9 is a side view of the present invention with the rolling base, with support roller in the up position.
Figure 10:
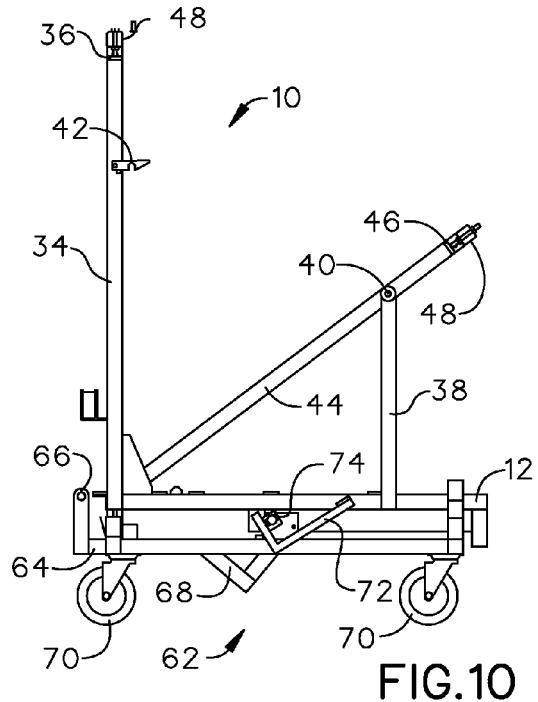
FIG. 10 is a side view of the present invention with the rolling base, with support roller in the down position.

The glass slat rack 10 includes a deployed position and a retracted position. The deployed position allows for multiple glass panels 76 to be inserted and secured within a slot of the vertical slat rack 15 and the corresponding slot of the pivoting slat rack 17. When the glass panels 76 are secured within the slots, the glass panels 76 may be safely transported. The retracted position may allow for a plurality of glass slat racks 10 to be stacked, as illustrated in FIG. 7, thereby conserving storage space. The deployed position may include the pivoting slat rack 17 to be pivoted at an angle in between the vertical slat rack 15 and the base frame 12. The retracted position may include the pivoting slat rack 17 pivoted to be adjacent to one of the base frame 12 and the vertical slat rack 15. As illustrated in the Figures, the retracted position includes the pivoting slat rack 17 pivoting upwards towards the vertical slat rack 15, and being substantially parallel to the vertical slat rack 15.

In certain embodiments, the vertical slat rack 15 and the pivoting slat rack 17 each include a first upright bar 34, a second upright bar 34, and a slat tensioning bar 48 securing the first upright bar 34 and the second upright bar 34 together. In certain embodiments, a slat bar 18 may run through the slats 16 from the first upright bar 34 to the second upright bar 34. The slats 16 may be separated be spacers 20, and a slat end cap 22 secured to each side of the slat bar 18 may secure the slat bar 18 and slats 16 in place. In certain embodiments, near the middle portion of the slat 16 may be a middle slat divider 24, which further secures the slats 16 and the slat bar 18 in place.

Figure 6:
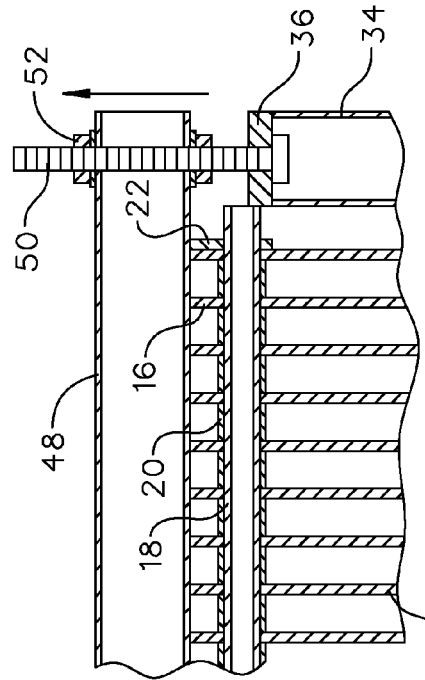
FIG. 6 is a detail section view of the present invention, illustrating the tightening of bar and slats.
Figure 5:
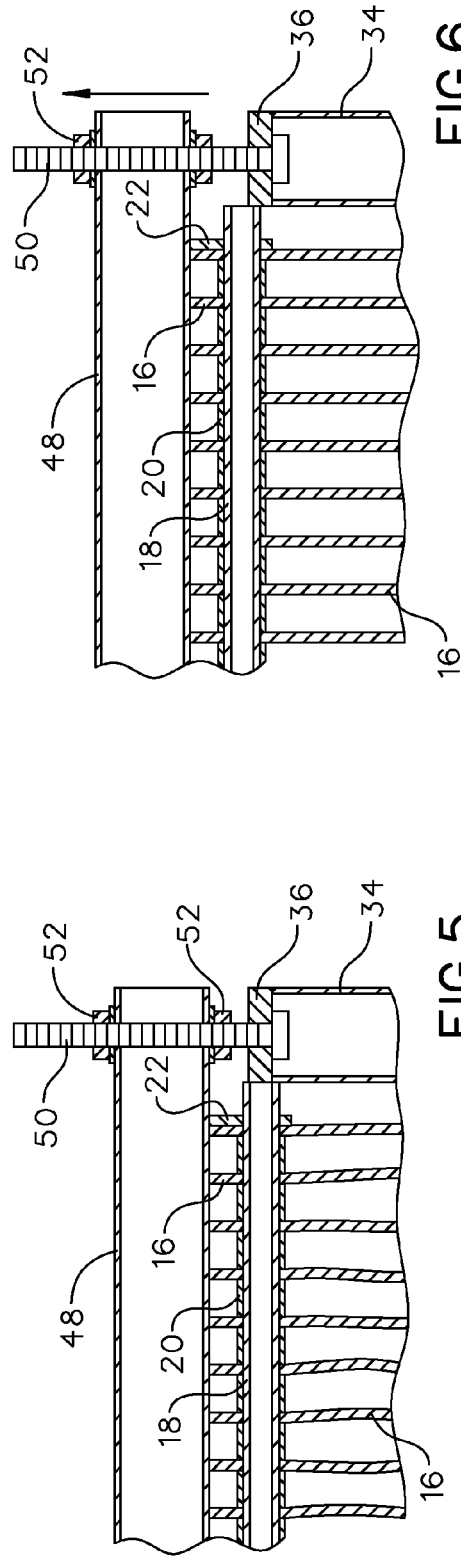
FIG. 5 is a detail section view of the present invention, with tensioning bar in a loosened position.

The present invention may further include a tensioner. Each of the vertical slat rack 15 and the pivoting slat rack 17 may include a tensioner. As illustrated in FIGS. 5 and 6, the tensioner is operable to pull the slats 16 into position. Therefore, when glass panels 76 are within the slots 16, the tensioner may secure the glass panels 76 to prevent movement. In certain embodiments, the tensioner may include the slat tensioning bar 48, slat tensioning rods 50 and slat tensioning nuts 52. A slat tensioning rod 50 may run through the slat tensioning bar 48 and into the top 36 of the first upright bar 34. Another slat tensioning rod 50 may run through the slat tensioning bar 48 and into the top 36 of the second upright bar 34. The tensioning rods 52 may be secured to the first and second upright bars 34. A threaded nut 52 may be secured to the slat tensioning rod 52 on either side of the slat tensioning bar 48. To activate the tensioner, the threaded nuts 52 on the top side of the tensioning bar 48 may be tightened, which pulls and secures the slats 16 in position. The slats 16 may secure the glass panels 76 within. The nuts 52 may be loosened to relieve the pressure, and thereby allow the glass panels 76 to be removed.

The pivoting slat rack 17 may be secured in the deployed position and the retracted position by different locking mechanisms. In certain embodiments, at least one middle upright bar 38, such as two, may extend vertically from the base frame 12 and may be about half of the height as the vertical slat rack 15. The pivoting slat rack 17 may include a rod 40 extending laterally from the first and second upright bars 34. To deploy the glass slat rack 10 of the present invention, the pivoting slat rack 17 may be pivoted downward from the vertical slat rack 15, and the rods 40 may rest against the middle upright bars 34. To keep the pivoting slat rack 17 in the retracted position, the vertical slat rack 15 may include a pivoting latch 42. The pivoting slat rack 17 may be pivoted towards the vertical slat rack 17 and the pivoting latch 42 may be releasably attached to the rods 40, thereby securing the pivoting frame 17 in the retracted position.

The present invention may further include protective structures to prevent the glass panels 76 from breaking or coming lose. For example, a stopper bracket 26 may be secured to the vertical slat rack 15. The stopper bracket 26 may include a first end and a second end. The first end may be attached to the first upright bar 34 and the second end may be attached to the second upright bar 34, thereby covering the slots on the opposite side of the pivoting slat rack 17. A stopper 28 may be placed in the stopper bracket 26, which prevents movement of the glass panels 76. The bottom of the vertical slat rack 15 may include a lower support bracket 30, with a lower support board 32 attached. The ends of the glass panels 76 may rest on the lower support board 32. The base frame 12 may include a plurality of cross bars 54, with cross bar boards 56 attached. The glass panels 76 may rest on the cross bar boards 56. Further, the base frame 12 may include support tabs 58 to contain the glass panels 76 within the base frame 12. The stopper 28, cross bar board 56, and lower support board 32 may be made of wood or other forgiving and non-scratching materials.

In certain embodiments, the base frame 12 may be mounted to a cart 62 for easy transportation. The cart 62 may include a cart frame 64 and a plurality of casters 70 attached. The cart frame 64 may include a rear portion and a front portion. The rear portion may be beneath the vertical slat rack 15. In certain embodiments, a plurality of rollers 66 may extend from the rear portion of the cart frame 64. Further, support rollers 68 may be attached to the cart frame 64 in between the rear portion and the front portion. Therefore, the glass panels 76 may easily be rolled onto the base frame 12 through the slots. In certain embodiments, the support rollers 68 may be retractable once the glass panels 76 have been secured within the slots. In such embodiments, a foot lever 72 may be attached to the additional rollers 68 by a spring loaded detent 74. When the lever 72 is activated, the additional rollers 68 may be deployed or retracted. The present invention secures the insulated glass panels vertically with the insulated glass panels referenced towards the front of the rack. The pivot frame may be tilted down and rested on the stops when the glass panels are in the rack. The slats separate the Insulated Glass units on the rack preventing them from touching and supporting them in a vertical orientation during shipment. The slates are tensioned by their attachment points at the top and bottom of the slat. The slat tensioning supports may be tightened which stretches the slats slightly making them taut so they give support to the insulating glass units. The rack tilts forward when sitting on the ground which tilts the insulated glass units forward resting on the wood brace during shipment so the insulated glass units do not vibrate around out of the slats and fall over into each other. When the rack is empty, the pivot frame is pivoted up and latched in position so another rack can be stacked on top of the first rack. This stacking allows more racks to be stored in a smaller area when not in use.

A method of using the present invention may include the following. The person would load (slide) the insulated glass unit into the rack until the front of the insulated glass unit reaches the stopper. This is repeated for every empty slot left on the rack. Once the insulated glass units are loaded on the rack (rack does not have to be full to complete next step) the wood brace is located onto the front of the rack to support the insulated glass units during transport. This sequence is reversed for unloading the units out of the rack. For storage, the pivot frame is pivoted up until it latches in the vertical position. With the pivot frame locked in the vertical position, additional racks can be stacked on the rack.

It should be understood, of course, that the foregoing relates to exemplary embodiments of the invention and that modifications may be made without departing from the spirit and scope of the invention as set forth in the following claims.

What is claimed is:

1. A glass slat rack comprising:
   a base frame;
   a vertical slat rack attached to and extending substantially perpendicular from the base frame, wherein the vertical slat rack includes:
      a plurality of first slats extending substantially parallel to one another and running vertically, forming slots therebetween, each of said plurality of first slats having one end attached to a first slat bar that is (i) moveable towards the base frame to decrease tension on the plurality of first slats and (ii) moveable away from the base frame to increase tension on the plurality of first slats, and
      a first tensioner operable to adjust tension applied to the plurality of first slats by moving the first slat bar in a direction towards the base frame and in a direction away from the base frame; and
   a pivoting slat rack pivotally mounted to the base frame, said pivoting slat rack comprising;
      a plurality of second slats extending substantially parallel to one another and forming slots therebetween, wherein the slots of the pivoting slat rack align with the slots of the vertical slat rack, each of said plurality of second base frame to decrease tension on the plurality of second slats and (ii) moveable away from the base frame to increase tension on the plurality of second slats, and
a second tensioner operable to adjust tension applied to the plurality of second slats by moving the second slat bar in a direction towards the base frame and in a direction away from the base frame.

2. The glass slat rack of claim 1, wherein the pivoting slat rack is moveable between (i) a deployed position, wherein the pivoting slat rack is located at an angle in between the vertical slat rack and the base frame, and (ii) a retracted position, wherein the pivoting slat rack is located adjacent to one of the base frame and the vertical slat rack.

3. The glass slat rack of claim 2, wherein the pivoting slat rack is located adjacent to the vertical slat rack in the retracted position.

4. The glass slat rack of claim 3, wherein the glass slat rack further comprises:
at least one middle upright bar extending vertically from the base frame, and at least one rod attached to the pivoting slat rack, wherein the pivoting slat rack is secured in the deployed position by pivoting the pivoting slat rack such that the at least one rod is resting against the at least one middle upright bar.

5. The glass slat rack of claim 4, wherein the vertical slat rack includes at least one latch releasably attachable to the at least one rod for securing the pivoting slat rack in the retracted position.

6. The glass slat rack of claim 1, wherein the vertical slat rack and the pivoting slat rack each further comprise:
a first upright bar, and
a second upright bar,
wherein the first and second upright bars of the vertical slat rack and the pivoting slat rack respectively support the first and second bars.

7. The glass slat rack of claim 6, wherein the glass slat rack further comprises:
a stopper attached to the first and second upright bars of the vertical slat rack, said stopper attached to a rear surface of the vertical slat rack.

8. The glass slat rack of claim 7, wherein the glass slat rack further comprises:
a plurality of supports attached to the base frame, wherein the stopper and the plurality of supports are comprised of a wood material.

9. The glass slat rack of claim 6, wherein the first tensioner includes:
a first tensioning bar connected with the first slat bar;
at least one threaded tensioning rod connected with the first tensioning bar; and
at least one nut threaded onto the at least one threaded tensioning rod,
wherein rotation of the at least one nut adjusts the tension applied to the plurality of first slats.

10. The glass slat rack of claim 6, wherein the second tensioner includes:
a second tensioning bar connected with the second slat bar;
at least one threaded tensioning rod connected with the second tensioning bar; and
at least one nut threaded onto the at least one threaded tensioning rod,
wherein rotation of the at least one nut adjusts the tension applied to the plurality of second slats.

11. A glass slat rack comprising:
a base frame;
a vertical slat rack attached to and extending substantially perpendicular from the base frame, wherein the vertical slat rack includes:
a plurality of first slats extending substantially parallel to one another and running vertically, forming slots therebetween, each of said plurality of first slats having one end attached to a first slat bar that is (i) moveable towards the base frame to decrease tension on the plurality of first slats and (ii) moveable away from the base frame to increase tension on the plurality of first slats, and
a first tensioner operable to adjust tension applied to the plurality of first slats by moving the first slat bar in a direction towards the base frame and in a direction away from the base frame.

12. The glass slat rack of claim 11, wherein the glass slat rack further comprises:
a pivoting slat rack pivotally mounted to the base frame, said pivoting slack rack comprising:
a plurality of second slats extending substantially parallel to one another and forming slots therebetween, wherein the slots of the pivoting slat rack align with the slots of the vertical slat rack, each of said plurality of second slats having one end attached to a second slat bar that is (i) moveable towards the base frame to decrease tension on the plurality of second slats and (ii) moveable away from the base frame to increase tension on the plurality of second slats, and
a second tensioner operable to adjust tension applied to the plurality of second slats by moving the second slat bar in a direction towards the base frame and in a direction away from the base frame.

13. The glass slat rack of claim 12, wherein said pivoting slat rack pivots between (i) a position substantially parallel to the vertical slat rack and (ii) a position substantially parallel to the base frame.

14. The glass slat rack of claim 12, wherein the pivoting slat rack is mounted to the base frame at a location adjacent to a lower end of the vertical slat rack.

15. The glass slat rack of claim 12, wherein the first and second slat bars are substantially horizontal bars.

16. The glass slat rack of claim 11, wherein said base frame is tilted forward such that a front end of the base frame is lower than a rear end of the base frame.

* * * * *